United States Patent [19]

Jack

[11] 4,111,860

[45] Sep. 5, 1978

[54] PROCESS FOR THE PRODUCTIONS OF MULTI-CELLULAR STRETCHED ARTICLES

[75] Inventor: James Jack, Mistley, England

[73] Assignee: Bakelite Xylonite Limited, London, England

[21] Appl. No.: 518,902

[22] Filed: Oct. 29, 1974

[30] Foreign Application Priority Data

Oct. 31, 1973 [GB] United Kingdom ............... 50654/73

[51] Int. Cl.$^2$ .......................... B29D 27/00; C08J 9/00
[52] U.S. Cl. ........................................ 521/84; 264/41; 264/45.3; 264/210 R; 264/288; 264/DIG. 17; 521/97; 521/90; 521/93; 521/88; 521/134; 521/136; 521/138; 521/143; 521/144; 521/146
[58] Field of Search ................... 264/41, 49, DIG. 13, 264/210 R, 45.3, 288, DIG. 17; 260/2.5 M, 2.5 E, 2.5 N, 2.5 HA

[56] References Cited

U.S. PATENT DOCUMENTS

| 3,694,399 | 9/1972 | Schwarz | 264/210 R X |
|---|---|---|---|
| 3,725,520 | 4/1973 | Suzuki et al. | 264/DIG. 13 |
| 3,741,860 | 6/1973 | Otsubo et al. | 264/210 R X |
| 3,765,999 | 10/1973 | Toyoda | 264/DIG. 13 |
| 3,775,521 | 11/1973 | Yamamoto et al. | 264/210 R X |
| 3,783,093 | 1/1974 | Gallacher | 264/210 R X |
| 3,790,435 | 2/1974 | Tanba et al. | 264/DIG. 13 |
| 3,840,625 | 10/1974 | Yamamoto et al. | 264/210 R X |
| 3,903,234 | 9/1975 | Ikeda et al. | 264/210 R |
| 4,067,938 | 1/1978 | Jack | 264/41 |

OTHER PUBLICATIONS

Muus, Laurits T.; N. Gerard McCrum and Frank C. McGrew. "On the Relationship of Physical Properties to Structure in Linear Polymers of Ethylene and Propylene" in *SPE Journal* May 1959, pp. 368–372.

*Primary Examiner*—Philip Anderson
*Attorney, Agent, or Firm*—Brisebois & Kruger

[57] ABSTRACT

A process for the manufacture of a multicellular stretched sheet which comprises melt compounding a thermoplastic matrix polymer and an additive comprising a polymeric or non-polymeric organic compound or a metal salt of an organic acid, forming the blend into a shaped article and stretching the article at a temperature within the normal orientation temperature of the matrix polymer and below the glass-transition temperature of the polymeric additive or below the melting or softening point of the non-polymeric additive.

16 Claims, No Drawings

PROCESS FOR THE PRODUCTIONS OF MULTI-CELLULAR STRETCHED ARTICLES

This invention relates to novel polymer compositions and to stretched articles produced therefrom.

Our co-pending U.S. patent application No. 454,762 relates to novel polymer compositions and to stretched shaped articles which can be made therefrom. The invention described therein provides, in particular, a process for the production of a stretched shaped article comprised by first making a shaped article from a blend of an orientable thermoplastics polymer and a metal resinate or rosin ester which is present in an amount not less than 2% of the total weight of said blend and then uniaxially or biaxially stretching said article at a temperature above the glass-transition point of the thermoplastics polymer and lying in the range in which the polymer can be oriented by stretching and below the softening point of the resinate or rosin ester to produce a multicellular article. The invention described therein also provides the blends from which the shaped articles are produced.

It has now been found that the range of compounds that may be employed in the process to give useful products may be extended beyond the metal resinates and rosin esters that have formerly been proposed.

The present invention provides a process for the production of a multicellular stretched article, which comprises forming a composition comprising a blend of a thermoplastics matrix polymer and from about 2 to 50% by weight, of the total weight of the blend, of an additive, by mixing together tha matrix polymer and the additive at a temperature at which they are both molten, the additive being a polymeric or non-polymeric organic compound or a metal salt of an organic acid, other than a metal resinate or rosin ester, and being at least partially incompatible with the matrix polymer in the concentration employed at the temperature at which the article is subsequently stretched, the additive not being a polymeric organic additive when the matrix polymer is a crystallizable polymer other than an olefin polymer, forming an article from the blend, and then stretching the article at a temperature which is within the normal orientation temperature range for the matrix polymer and which, when the additive is a polymeric organic additive, is below the glass-transition temperature of the additive, or, when the additive is a non-polymeric additive is below the melting or softening point of the additive, so that micro voids are formed in the matrix.

The matrix polymer, as employed in the present invention may comprise any thermoplastics polymer or blend of compatible thermolastics polymers, having physical properties enabling the shaped article to be stretched while retaining its unitary form. Such polymers include synthetic, high molecular weight film-and fibre forming, orientable linear polymers such as polyesters, polyamides, polyolefins and vinyl polymers. Polyesters include polyethylene terephthalate and related copolymers, polyamides include polycaprolactam, polyolefins include polyethylene, polypropylene and poly-4-methyl pentene-1 and vinyl polymers include polyvinyl chloride and poly-styrene. Preferably, however, the matrix polymer is a crystallizable polymer such as polyethylene terephthalate, polycaprolactam, high density polyethylene, polypropylene and poly-4-methyl pentene-1. As will be appreciated, for the purpose of this invention, the term "crystallizable polymers" includes crystallizable polymers which may be quenched to a relatively stable amorphous state, such as polyethylene terephthalate, as well as those which always have some crystallinity at temperatures below the melting point, such as polyethylene.

The additive employed in the present invention may be any organic compound, or metal salt of an organic acid, having the required physical properties but may also comprise a thermoset resin; however, for the reasons of obtaining good dispersion and ease of filtration of the blend, it is essential that there is a melt compounding temperature at which both matrix polymer and additive are molten and at which temperature, the additive may be compatible or incompatible with the matrix polymer.

The term "incompatible" as used in this specification should be understood to mean, that the additive forms a phase distinct from that of the matrix polymer. The existence of the two phases may be detected, for instance, by differential thermal analysis.

As additive there may be employed, for example, non-polymeric additives such, for example, as substituted or unsubstituted benzoic acid, including p-toluic acid and p-tertiary butyl benzoic acid, benzoic acid derivatives, adipic acid, isonicotinic acid hydrazide, itaconic acid, tartaric acid, lactose, trimellitic anhydride, metal salts of the acids exemplified and modified or unmodified natural products other than metal resinates and rosin esters. As examples of polymeric additives, there may be mentioned modified and un-modified natural resins and synthetic thermoplastic and thermoset resins. Of the synthetic thermoplastics resins, those having low molecular weights are amongst those which have suitable physical properties, for example low molecular weight polycarbonates. Polyvinyl carbazole, polyvinyl acetal and phenoxy resins are also amongst those synthetic thermolastics resins which may be employed. Phenolformaldehyde and non-linear polyester resins are exemplary of thermoset resins. Thermoset additives may be blended with the matrix polymer in the form of an uncured or partially cured precursor.

It is also possible, where an additive used alone has a melting or softening point that is too high to enable it to be melt compounded with the matrix polymer, to use a second additive that will reduce the melting temperature of the first additive to a satisfactory level.

When the additive is non-polymeric, the softening point, or in tthe case of relatively pure compounds, the melting point is employed to facilitate its selection. The softening point is measured by the ring and ball method described in ASTM number E28-67. The melting point of non-polymeric relatively pure compound can be determined by any of the well known methods.

The additive is present in the blend in an amount of from 2 to 50%, preferably 5 to 25%, by weight of the total weight of the blend.

The compositions may also contain supplementary additives such as fillers (both organic and inorganic) dyes or pigments, lubricants, antistatic agents, antioxidants, stabilisers, blowing agents or minor quantities of incompatible polymers. It has been found that the addition of certain fillers or pigments for example calcium carbonate, titanium dioxide and diatomaceous earth, can act to enhance the formation of voids when an article from the composition is stretched. Generally the density reduction increase is more easily achieved as the particle size of the fillers or pigments increases. Fillers or pigments having a very fine particle size of the order of 0.1 μ are less effective in enhancing the density reduction on stretching. Fillers or pigments having particle sizes greater than 10 μ are efficient but produce a coarse cell structure in the stretched articles which makes itself evident at the surface of the article which can be undesirable for certain applications, for example, if the stretched articles are to be printed. When the stretched article is intended for printing applications, the particle size range of the fillers or pigments employed is advantageously from 1 μ to 10 μ, preferably 2 μ to 8 μ.

In some cases where stretching a composition containing an additive does not result in a density reduction, the addition of a filler or pigment, will produce a composition which, when stretched, will give rise to a density reduction greater than that which would be expected from the filler alone in the thermoplastics material, showing that the filler effectively activates the void forming property of the additive which causes a reduction in density of the composition on stretching. Calcium carbonate fillers in particular can behave synergistically with the additives of the invention. That is to say that the degree of density reduction obtained on stretching a composition containing an additive plus calcium carbonate, may be greater than the sum of the respective density reductions obtained on stretching a blend containing the same proportion of that additive and a control composition containing the same proportion of the calcium carbonate in the same thermoplastics material. Fillers and/or pigments may be added in a preferred amount of up to 30% by weight, calculated on the weight of the composition (i.e. including the filler and/or pigment).

Supplementary additives should not, of course, be such as to undesirably affect the production of a multicellular structure when a shaped article is stretched according to the process of the present invention.

The invention also includes shaped articles made from the polymer compositions of the invention and a method for making a multicellular stretched article by stretching such a shaped article.

The stretching process may be uniaxial or biaxial and is carried out at a temperature above the glass-transition point of the thermoplastics material can be oriented by stretching and below the softening point of the metal resinate or rosin ester.

When the thermoplastics material is a crystalline material the stretching temperature is below the crystalline melting point of the material.

Certain additives may not be suitable as void forming additives for use with certain polymers and even for a given additive the suitability may vary from batch to batch.

The suitability of an additive for use in the composition of the invention may be determined by the following test.

Test Procedure (1) Test compositions are prepared as follows:
(a) 15 parts by weight of the chosen additive are uniformly and finely dispersed in 85 parts by weight of the thermoplastics matrix material by blending under fluxing conditions for the thermoplastics material and the additive, (b) 15 parts by weight of the chosen additive and 5 parts by weight of an uncoated calcium carbonate filler of mean particle size 2.5 μ are uniformly and finely dispersed in 80 parts by weight of the thermoplastics material by blending under fluxing conditions for the thermoplastics material and the additive (c) 5 Parts by weight of the uncoated calcium carbonate filler used in (b) are uniformly and finely dispersed in 95 parts by weight of the thermoplastics material by blending under fluxing conditions for the thermoplastics material.

(2) Test specimens are then produuced from compositions (a), (b) and (c) and also from (d) which is the thermoplastic material without additives by shaping the compositions under heat and pressure into samples free from significant flaws and free from significant molecular orientation of the thermoplastics material and having a uniform thickness. From each sample is cut a specimen suitable for uniaxial stretching on an Instron tensile testing machine or similar machine.

(3) Test specimens, which have a shape such that the major part of the elongation during stretching occurs in a region initially of uniform cross-section, are then individually stretched uniaxially in the Instron tensile testing machine at various temperatures lying in the normal orientation temperature range for the thermoplastics material, the maximum test temperature being the softening or melting point of a non-polymeric additive or the glass temperature of a polymeric additive, at a uniform gripper separation rate of 4 to 10 inches/min. the initial gripper separation being one to two inches. The test specimen is stretched to just before break (determined by stretching one test specimen to break and stretching a second to 90% of the elongation at break of the first) and so that the gripper separation is increased by at least 100%, the specimen remaining securely gripped. The stretched test specimens are then cooled, if necessary, to room temperature and released.

(4) Samples are cut from the narrowest portion of each stretched test specimen and the density of each sample is determined. The densities of each of stretched samples (a), (b), (c) and (d) are compared with the density of the relevant unstretched test specimen and the percentages density reduction is calculated.

For additives suitable for use in compositions of the present invention without fillers the difference between the percentage density reduction achieved with a Specimen (a) and the percentage density reduction achieved with the corresponding specimen (d) is greater than or equal to 3.

For additives suitable for use in the compositions of the invention with fillers the difference between the percentage density reduction achieved with a specimen (b) and the percentage density reduction achieved with the corresponding specimen (c) is greater than or equal to 3.

In addition to establishing those additives that are suitable for use in the invention the test also provides a guide to the temperature conditions under which multicellular articles can be produced from a given composition by uniaxial stretching.

The stretching of a shaped article in the process of the present invention may be achieved by any method normally suitable for uniaxially or biaxially stretching the particular thermoplastics matrix polymer employed formed into the shape of the shaped article produced from the blend. Examples of stretching methods that may be employed include longitudinal or transverse uniaxial stretching of sheet or strip; simultaneous or sequential biaxial stretching of sheet; "bubble-blowing" of tubes; longitudinal stretching of filaments; blowing of bottles and other hollow articles; vacuum- or pressure-forming of sheet. The degree of stretching employed in the process of the invention is dependent upon the matrix polymer of the blend and upon the heat-history to which the shaped article is subjected during the time which elapses between its formation and the start of its being stretched. It is, for example sometimes advantageous to provide a "heat-seasoning" or annealing stage prior to the entry of the shaped article into the stretching stage of the process.

The temperature at which the shaped article is stretched in the process of this invention is within the normal orientation temperature range for the matrix polymer. By "normal orientation temperature range" we mean that range of temperatures for the matrix polymer well known to those skilled in the art, bounded at the lower end by the minimum temperature at which uniaxial stretching of the matrix polymer can be effected at a commercially acceptable rate and at the upper end by the maximum temperature at which stretching of the matrix polymer may be effected to achieve a usefully oriented product.

For crystallisable polymers such as polyethylene, polypropylene and some other polyolefins the upper limit of the range will be in the region of, but below, the crystalline melting point of the polymer. For crystallizable polymers such as polyethylene terephthalate the upper limit of the range will be within 40° C above the glass transition temperature of the polymer and for the essentially amorphous polymers such as polystyrene and polymethylmethacrylate, the upper limit of the range will be within 50° above the glass transition temperature of the polymer.

The following table gives the normal orientation temperature ranges which are commercially employed for some well known thermo-plastics polymers, together with the commercial range of linear stretch ratios respectively for uniaxial and biaxial stretching of the polymers at temperatures within the normal orientation temperature range.

The following table gives typical commercially acceptable out-put speeds for various products and output rates of the order given or above are considered for the purpose of this invention to be commercially acceptable:

| Stretching made | Product | | Out-put speed ft/min |
|---|---|---|---|
| Uniaxial Stretching | | Continuous | 4000 |
| Fibres | 1 to 3 thou thick | | |
| | | Staple | 250 to 500 |
| Tape | 2 thou thick | | 350 to 400 |
| | 20 thou thick | | 200 |
| Monofilaments | 5 – 20 thou thick | | 200 to 400 |
| Biaxial Stretching | | | |
| Thick film | Approx 10 thou thick | | 25 to 100 |
| Thin film | ½ to 1 thou thick | | 100 to 750 |

Clearly, within the normal orientation temperture range for a matrix polymer, persons skilled in the art can determine suitable stretch ratios and stretch rates for use in the process of the present invention.

The unstretched shaped articles produced from the blends of this invention do not, in the absence of blowing agents or other cell producing additive, exhibit any cellular structure. However, the stretched articles exhibit a multicellular structure. The mechanisms by which the multicellular structures of the present invention are obtained ar not fully understood, but it appears that in some cases, stretching of the shaped article causes fragmentation of the additive which facilitates and enhances void formation. It also seems possible that during stretching the bonds between the additive and the matrix may be broken, for example, either by the direct action of the applied stresses or by such stresses causing the additive to "neck" within the matrix so that a thinned portion of the additive becomes at least partially separated from the matrix polymer, with or without ultimate fracture of the additive within the matrix polymer.

Supplementary additives such as those mentioned hereinbefore may effect a lowering of the glass transition point, softening point or melting point of the additive to a temperature below that measured on the additive itself. This lowering cannot be predicted with any certainty and accordingly, we prefer to conduct the stretching stage at a temperature at least 10° C lower than the glass transition point, softening point or melting point of the additive as measured on the additive itself.

It will be appreciated that the temperature of the shaped article at the time of stretching need not be uniform, for example through the thickness of a sheet. Thus, the rate of heating or cooling may be such as to bring about a temperature differential through the

| Polymer | Uniaxial Stretch | Biaxial Stretch | Normal Orientation Temperature Range ° C |
|---|---|---|---|
| Polypropylene | 7:1 to 12:1 | 5:1 to 10:1 | 125 – 165 |
| Polyvinylidene chloride | 4:1 to 6:1 | 2½:1 to 4:1 | 10 – 30 |
| Polystyrene | 6:1 to 10:1 | 3:1 to 5:1 | 100 – 130 |
| Unplasticized PVC | 2½:1 to 5:1 | 2:1 to 2½:1 | 90 – 130 |
| Polyethylene terephthalate (Quenched) | 4:1 to 6:1 | 2:1 to 4:1 | 85 – 110 |
| High Density Polyethylene | 4:1 to 10:1 | 4:1 to 10:1 | 100 – 130 |
| Nylon 66 (Quenched) | 3:1 to 6:1 | 2½:1 to 4:1 | 60 – 90 | shaped article in a direction perpendicular to the direction of stretch, just prior to stretching, causing only a portion of the shaped article to be at the specified temperature of stretching. Thus, it is within the scope of this invention to produce a stretched article having a graded structure which may comprise regions of different densities.

The cellular nature of a multicellualr article provided by the process of the present invention causes it to have a density which is lower than that of the unstretched article from which it is formed. The increase of volume of an article can be related to its change of density, assuming that the weight of any gas (most probably air) in the cells can be ignored, by:

$$\% \text{ increase of volume} = 100 \left(\frac{D_1}{D_2} - 1\right)$$

where $D_1$ = density of unstretched article
$D_2$ = density of stretched article The volume of the cells existing in the multicellular article can be expressed as a percentage of the overall volume of that article as $$\% \text{ cellular volume} = 100 \left(1 - \frac{D_2}{D_1}\right)$$

Thus, a 33⅓% reduction of density gives a 50% increase of volume; the resulting multicellular article will have 33⅓% of its volume existing as voids. Examples given later illustrate the density and volume changes which can be achieved by the process of the present invention.

The structure of multicellular stretched articles made from unfilled, unpigmented blends of this invention leads to a degree of opacity of the articles because of scattering of light by the cells.

The first visually detectable degree of opacity occurs when the additive constitutes about 2% of the weight of the blend in which it is incorporated.

The multicellular products of this invention obtained from unfilled un-pigmented blends, which products have been stretched uniaxially or biaxially may have voids having a minimum dimension of 3 μ and a maximum dimension of up to 25 μ. The presence of supplementary additives such as fillers and pigments in the compositions can have the effect of increasing at least one of these dimensions. Plate-like voids having dimensions of the order, for example: diameter in plane of stretch: 17 μ and a maximum dimension at right angles thereto: 3 μ, may be achieved by employing biaxial stretching.

It is envisaged that other processes may also be conducted on the stretched articles produced from the compositions. Possible treatments include the use of corona-discharge, chemical oxidation, UV-irradiation, solvents and swelling agents and the application of surface coatings and are used to improve the "receptivity" of the surface of the article to marking agents.

The multicellular products of this invention may be used for all applications where articles having a lowered density and a degree of opacity are useful. Thus, we have found that unpigmented and unfilled sheet made by the process of the invention from blends containing 15% of an additive and based either on linear polyethylene (also known as "high density polyethylene") or on isotactic polypropylene has a paper-like "feel", and after suitable corona discharge treatment, can be printed excellently by conventional printing methods. These prints adhere well to the sheet. Such materials can thus be used as synthetic papers. Sheet made by the process of the invention may be heat-sealed to form bags or wrappers. Filaments made by the process of the invention may be used directly in the form produced or they may be subjected to further treatment to be broken down to fibril form e.g. by severe mechanical treatment which may be coupled with subjection to solvents or heat. These fibrils may then be used in processes employed by the textile and paper industries.

It will also be appreciated that an unstretched shaped article of this invention may comprise only part of a larger stretchable structure, and may be, for example a lamina of a multiple laminae structure prepared by, for example, a co-extrusion process.

The following examples are given to illustrate the present invention, but are not to be construed as limiting the scope thereof. In the Examples, unless otherwise specified, the proportions of materials specified are by weight.

EXAMPLE 1

(polydiancarbonate)

Polycarbonate/having a K-value of 33 a glass transition temperature of 133° C and a softening point of approximately 160° C was extrusion blended with high density polyethylene Rigidex 2000 (B.P. Chemicals Ltd) in the proportions 15:85 by weight. The blending was effected in a 1⅛ inch twin screw extruder fitted with a 1 inch × 1/32 inch tape die, the extruder temperatures ranging from 110° C at the feed end to 175° C at the die. The extrudate was quenched, diced and dried and then re-extruded under the same conditions to produce a tape for stretching. Samples of the tape were machine direction (MD) stretched uniaxially at average linear rates respectively of approximately 518%/min, 696%/min and 714%/min at temperatures of 100° C, 120° C and 130° C and at stretch ratios of 8.25:1 10.0:1 15.0:1 respectively.

The respective densities of the material stretched at the different temperatures were compared with that of the unstretched material, the densities being determined by a flotation method. The results are tabulated below:

| | Density Reduction | | |
|---|---|---|---|
| | 100° C | 120° C | 130° C |
| Rigidex 2000 85% (by weight) Polycarbonate 15% (by weight) | 13% | 11% | 3% |

When the above described compound and extrusion procedure was repeated but incorporating 5% Calcium Carbonate filler as well as 15% polycarbonate in the matrix resin (80%), a specimen of the tape MD stretched 8:1 uniaxially at an average linear rate of 500%/min at 100° C gave a product having a density 17% lower than that of the unstretched tape.

The K-value quoted in this Example was determined by: measuring the relative viscosity ($\eta_{rel}$) of a 0.4% w/v solution of the polymer in dichloromethane, employing the method of BS2782 using a suspended level viscometer, and the 'K' value was then calculated from the formula:

$$\frac{\log_{10} \eta_{rel}}{C} = \frac{75 K^2}{1 + 1.5 KC} + K$$

where C = concentration of polymer in solvent in g/100 ml. and $\eta_{rel}$ = T where T = time of flow of solution To. To = time of flow of solvent.

EXAMPLE 2

Polycarbonate as manufactured by Farbenfabriken Bayer A.G. and sold under the name of Makrolon type 2601, having a glass transition temperature of approximately 150° C and a softening point of approximately 230° C. and polypropylene (PXC 3391 (ICI Ltd.) were extrusion blended in a 2¼ inch twin screw estruder in the proportions 15:85 by weight employing a melt temperature of 250° C. The extrudate was pelleted then re-extruded through an annular die held at 200° C, into a water bath held at 20° C. The tube had an internal diameter of 35 mm and a wall thickness of 0.65 mm. The tube was taken continuously from the water bath and stretched in a blown-bubble process at a temperature of approximately 143° employing stretch-ratios of 6.5:1 in the machine direction (MD) and 6.0:1 in the transverse direction (TD) and at a rate of stretch (surface area) of approximately 100,000% per minute. Tubular film was produced in layflat form at a width of 335 mm. The density of the stretched film was determined by a flotation method and compared with that of a sample of the material of the un-blown tube and a density reduction as a result of stretching was calculated as follows:

$$\left(\frac{D_1 - D_2}{D_1}\right) 100\% = \left(\frac{1.01 - 0.77}{1.01}\right) 100\%$$
$$= 24\%$$

Other physical properties of the stretched material were measured and the results are compared with those of a control stretched film, produced from unadulterated PXC 3391 and employing the same conditions, in the following Table:

| | Ex 3 | Control |
|---|---|---|
| Breaking strength (5 inches/min lb/sq inch) | 17440 MD | 23080 MD |
| | 10670 TD | 16330 TD |
| Elongation % at break | 69 MD | 45 MD |
| | 53 TD | 40 TD |

EXAMPLE 3

Makrolon type 2601 having a glass transition temperature of approximately 150° C was blended with Rigidex 2000 in a 2¼ inch twin-screw extruder, in the proportions 15:85 by weight employing a melt temperature of 250° C. The extrudate was pelleted then re-extruded through an annular die held at 230° C, into a water bath held at 20° C. The tube thus extruded had an internal diameter of 35 mm and a wall thicknes of 0.67mm. The tube was taken continuously from the water bath and stretched in a blown bubble process at a temperature of approximately 130° C using an MD stretch ratio of 6.5:1, a TD stretch ratio of 6:1 and a rate of stretch (surface area) of approximately 100,000% per minute. Tubular film was produced in layflat form at a width of 335 mm. The density of the stretched film was found to be 0.81 gm/ml as compared with 1.02 gm/ml for the un-blown tube giving a density reduction on stretching of $$\left(\frac{1.02 - 0.81}{1.02}\right) \times 100\% = 21\%$$

Other properties of the stretched film are compared with those of a control stretched film produced from unadulterated Rigidex 2000 and employing the same conditions, in the following Table:

| | Ex. 4 | Control |
|---|---|---|
| Breaking strength (5"/min) lb/sq inch | 14000 MD | 19740 MD |
| | 11240 TD | 16920 TD |
| Elongation % at break | 81 MD | 125 MD |
| | 93 TD | 120 TD |

EXAMPLE 4

P-toluic acid was tumble mixed with Nylon 11, supplied under the name of Rilsan BESN by Aquitaine Organico S.A., in the proportions 15:85 by weight. The mixture was then dried thoroughly and then fed to a 1⅛ inch single screw extruder, fitted with a 1 inch × 1/32 inch slot die, the extruder having temperatures along its length as follows

| Feed end | 200° C |
|---|---|
| Metering section | 230° C |
| Die | 200° C |

The extruded tape was allowed to cool and a specimen taken which was then stretched in the machine direction (MD) at various temperatures. The densities of the stretched materials were measured by a flotation method and the results compared with the density of the unstretched material and the % differences calculated. The procedure was then again repeated omitting the additive for the purpose of providing a control. The results obtained are tabulated below:

| | Nylon 11 85% | Nylon 11 100% |
|---|---|---|
| % Density reduction: | | |
| 70° C | 6 | 0 |
| 100° C | 6 | <1 |
| 120° C | 5 | <1 |
| 130° C | 5 | <1 |
| Stretch ratios: | | |
| 70° C | 2.25:1 | 1.50:1 |
| 100° C | 2.50:1 | 2.75:1 |
| 120° C | 2.75:1 | 2.81:1 |
| 130° C | 3.00:1 | 3.50:1 |
| Average rate of linear stretch %/min: | | |
| 70° C | 625 | 250 |
| 100° C | 375 | 437 |
| 120° C | 437 | 562 |
| 130° C | 500 | 625 |

EXAMPLE 5

Additives "a" to "g" as specified below, were each in turn blended with Rigidex 2000 in the proportions 15:85 by weight. In the cases "b" to "g", the blending was effected using a 1⅛ inch twin screw extruder fitted with a 1 inch × 1/32 inch tape die, the extruder temperatures ranging from 110° C at the feed end to the respective temperatures indicated in the table below for the metering section and the die. The extrudate was cooled by passage through an air cooling ring, diced, dried and then re-extruded under the same conditions to produce a tape which in hauling off from the die was drawn down as little as possible. In the case of additive "a", initial dispersion was effected on a two-roll mill employing roll temperatures respectively of 155° C and 160° C. The sheet obtained from the mill was cooled, diced, dried and the resultant compound then fed to the extruder referred to above employing the temperatures and conditions specified to produce an extruded tape of the material.

Specimens of each of the tapes were cut and uniaxially stretched along the machine direction at various temperatures. The density reductions on stretching were measured and tabulated as shown below. The results are compared with those obtained for a control specimen of pure Rigidex 2000, obtained by an extrusion procedure similar to that described above and employing an extruder metering section and die temperature of 165° C, which when stretched similarly gave zero density reductions at each of the temperatures 100, 120, 130° C respectively.

The code letters employed in the following Table denote the following compounds:

(a) Lactose; (b) isonicotinic acid hydrazide; (c) Adipic acid; (d) calcium tartrate; (e) para-toluic acid; (f) trimellitic anhydride (g) itaconic acid.

Flat substantially opaque sheet was produced of trimmed width 1470 mm and thickness approximately 33 microns at an out-put rate of 120 ft/min. The sheet produced had a multicellular structure in which the cells were predominantly of closed type. On comparison with the unstretched material, the stretched material was shown to have a reduced density of the order of 10%. After surface treatment by corona discharge, the sheet was found to print well when passed through an off-set lithographic printing machine.

EXAMPLE 7

Example 6 was repeated except that the high density polyethylene and the polycarbonate were extrusion blended together in different proportions and with calcium carbonate filler (Calopake F — Average particle size 2.5 microns — as supplied by J & E Sturge Ltd.), the relative proportions by weight of the three components being 70:10:20. In addition the temperature of the sheet during stretching was arranged to be 125° C. The product which had a thickness of approximately 35 microns was white and opaque and flat lying. The sheet had a multicellular structure in which the cells were predominantly of closed type. The density reduction observed in the stretched material as compared with the unstretched material was of the order of 15%. After surface treatment by corona discharge, the sheet printed well by the off-set lithographic printing process.

What we claim is:

|  | a | b | c | d | e | f | g |
|---|---|---|---|---|---|---|---|
| % Density reduction: |  |  |  |  |  |  |  |
| 100° C | 26 | 12 | 11 | 12 | 19 | 12 | 9 |
| 120° C | 23 | — | 9 | — | 15 | 10 | 8 |
| 130° C | 18 | — | 9 | — | 4 | 6 | 7 |
| Stretch ratios: |  |  |  |  |  |  |  |
| 100° C | 8.25:1 | 7.00:1 | 7.00:1 | 7.00:1 | 8.00:1 | — | 8.50:1 |
| 120° C | — | — | 8.00:1 | — | 8.50:1 | — | 9.50:1 |
| 130° C | 10.00:1 | — | 11.00:1 | — | 10.00:1 | 7.00:1 | 9.50:1 |
| Average Linear rate of stretch %/min |  |  |  |  |  |  |  |
| 100° C | 518 | 857 | 429 | 857 | 500 | — | 536 |
| 120° C | — | — | 500 | — | 536 | — | 609 |
| 130° C | 643 | — | 714 | — | 643 | 500 | 609 |
| Melting point of additive ° C: | 201–202 | 171 | 166–170 | 200 | 180–181 | 161–164 | 166–170 |
| Temperature of metering section and die of extruder ° C | 205 | 175 | 175 | 205 | 185 | 170 | 175 |

EXAMPLE 6

High-density polyethylene ("Rigidex 2000", supplied by BP Chemicals Ltd.) of glass transition point −30° C and crystalline melting point 135° C, was extrusion blended with Makrolon type 2601 polycarbonate in the proportions, by weight, of 85:15, in a twin screw extruder employing a melt temperature of 250° C. The extrudate was pelleted then re-extruded through a slot die held at 230° C as a sheet and passed between metal rollers held at 70° C. The sheet had a width of 370 mm and a thickness of 0.54 mm. The sheet was re-heated and then simultaneously biaxially stretched on a flat-bed stretcher at a sheet temperature of about 126° C with a machine direction stretch ratio of 4:1 and a transverse direction stretch ratio of 4.5:1 and at a rate of stretch (surface area) of 25,500% per minute.

1. A process for the production of a multi-cellular stretched article, which process comprises the steps of forming a composition comprising mixing a melted blend of a stretchable thermoplastic organic polymer matrix and an additive which reduces the density of the resulting article and is non-molten or non-softened in the normal orientation temperature range of the matrix polymer, at a temperature at which the matrix polymer and additive are molten, forming an article from said composition, and then stretching the article at a temperature which is within the normal orientation temperature range for the matrix polymer so that micro-voids are formed in the matrix polymer, said additive constituting from about 2 to 50% by weight of the total weight of the blend, being at least partially incompatible with the matrix polymer in the concentration employed when and at the temperature at which said article is subsequently stretched, being selected from the group consisting of organic polymeric, organic acids, and those metal salts of organic acids other than metal resinates and rosin esters, except when the matrix polymer is a crystallizable polymer other than an olefin, in which case said additive is selected from the group consisting of organic acids and their metal salts other than metal resinates and rosin esters, the temperature at which said article is stretched being below the glass-transition temperature of said additive when said additive is a polymer, and below the melting or softening point of the additive when said additive is an organic acid, organic derivative or a modified or unmodified natural product.

2. The process of claim 1, wherein the matrix material is an olefin polymer or copolymer, a polyester, a polyamide, polystyrene, or a vinyl polymer.

3. The process of claim 1, wherein the matrix material is a crystallizable polymer.

4. The process of claim 3, wherein the matrix material is a polyolefin.

5. The process of claim 4, wherein he matrix material is an ethylene or propylene polymer or copolymer.

6. The process of claim 5, wherein the matrix material is a high density polyethylene.

7. The process of claim 1 wherein the additive is a polymeric additive and is a polycarbonate, polyvinyl carbazole, polyvinyl acetal, a phenoxy resin, a phenol-formaldehyde resin or a non-linear polyester resin.

8. The process of claim 1 wherein the additive is a non-polymeric additive and is substituted or unsubstituted benzoic acid, adipic acid, tartaric acid, itaconic acid or a metal salt of such an acid, a benzoic acid derivative, isonicotinic acid hydrazide, lactose, trimellitic anhydride or a modified or unmodified natural product.

9. The process of claim 1 in which the composition also contains a filler and/or a pigment.

10. The process of claim 9, wherein the filler is calcium carbonate or diatomaceous earth and/or the pigment is titanium dioxide.

11. The process of claim 9, where the filler or pigment has a particle size of 1 to 10 $\mu$, preferably 2 to 8 $\mu$.

12. The process of claim 9, wherein the filler and/or pigment is present in an amount of up to 30% by weight calculated on the total weight of the composition.

13. The process claim 17, wherein the additive is present in an amount of from 5 to 25% by weight, calculated on the blend.

14. The process of claim 1, wherein the shaped article is a fiber, filament, tape, sheet, film or tube.

15. The multicellular stretched article produced by a process as of claim 1.

16. A synthetic paper produced by the process of claim 1.

* * * * *